United States Patent [19]

Anthony et al.

[11] Patent Number: 4,782,792
[45] Date of Patent: Nov. 8, 1988

[54] ANIMAL SHOWER

[76] Inventors: Michael F. Anthony, 3521 W. Ridge Dr., West Valley City, Utah 84119; Weldon S. Fox, 1475 S. Gillespie Ave., Apt. B, Salt Lake City, Utah 84104

[21] Appl. No.: 882,404

[22] Filed: Jul. 7, 1986

[51] Int. Cl.[4] .............................................. A01K 13/00
[52] U.S. Cl. ...................................... 119/158; 119/159
[58] Field of Search ........................ 119/158, 159, 160

[56] References Cited

U.S. PATENT DOCUMENTS

| | | | |
|---|---|---|---|
| 3,602,199 | 8/1971 | Diggs | 119/159 |
| 3,699,928 | 10/1972 | Cowan | 119/159 |
| 3,867,906 | 2/1975 | Johnson | 119/158 |
| 3,884,191 | 5/1975 | Stout | 119/158 |
| 4,020,796 | 5/1977 | Grifa | 119/158 |
| 4,056,078 | 11/1977 | Blafford et al. | 119/158 |
| 4,083,328 | 4/1978 | Baker | 119/158 |
| 4,505,229 | 3/1985 | Altissimo | 119/158 |

Primary Examiner—Carl D. Friedman
Assistant Examiner—Creighton Smith
Attorney, Agent, or Firm—Jon C. Christiansen

[57] ABSTRACT

An animal shower having a plurality of U-shaped conduits which define an open area to be occupied by an animal. The U-shaped conduits receive water from a water source and are perforated to direct water onto the animal. Water can be supplied to the U-shaped conduits through a base conduit.

7 Claims, 1 Drawing Sheet

ANIMAL SHOWER

INTRODUCTION

This invention relates to animal showers and a soap introduction system which can be used in connection with animal showers. Animal cleanliness is a problem for many animal owners. Dogs, cats and other pets need to be kept clean for the sake of their owners who may desire to bring the animals indoors or to come into contact with the animals. Animals other than pets, for example dairy cows, must also be kept clean for health and sanitation purposes. The animal shower of this invention is useful with a wide variety of animals, including (without being limited thereto) dogs, cats, cows, goats, horses and the like. The animal shower of this invention provides a means for cleaning animals which does not require hand scrubbing. The animal shower can be used to effectively and easily clean animals.

SUMMARY OF THE INVENTION

The animal shower of this invention is a plurality of U-shaped conduits which collectively define an open area to be occupied by an animal. (As used in this disclosure and the appended claims the term "U-shaped" is intended to be broadly construed. For example, V-shaped conduits are deemed to be U-shaped conduits.) The U-shaped conduits are adapted to receive water from a water source. The water is preferably supplied to the U-shaped conduits through a base conduit connected to the U-shaped conduits. The U-shaped conduits are perforated and the perforations are positioned to direct water onto the animal. Preferably, the base conduit (if used) is also perforated and its perforations are positioned to direct water onto the animal. A cover conforming in shape to the open area defined by the U-shaped conduits can be positioned over the U-shaped conduits.

The soap introduction system of this invention, which can be used as part of the above-described shower, has a primary conduit and a secondary conduit connected at an angle to the primary conduit to allow for the flow of water from the secondary conduit to to the primary conduit. The phrase "connected at an angle" means that the two conduits are neither parallel nor collinear. Preferably the angle is such that the secondary conduit is perpendicular to the primary conduit. A soap tablet (of any soap suitable for animals) is positioned inside of the secondary conduit. The soap tablet is preferably cylindrical in shape. The length of the tablet must be sufficiently greater than the inside diameter of the primary conduit such that the initial flow of water does not cause the tablet to be lost to (i.e. swept through) the primary conduit.

DETAILED DESCRIPTION OF AN EMBODIMENT OF THE INVENTION

Figure 1:
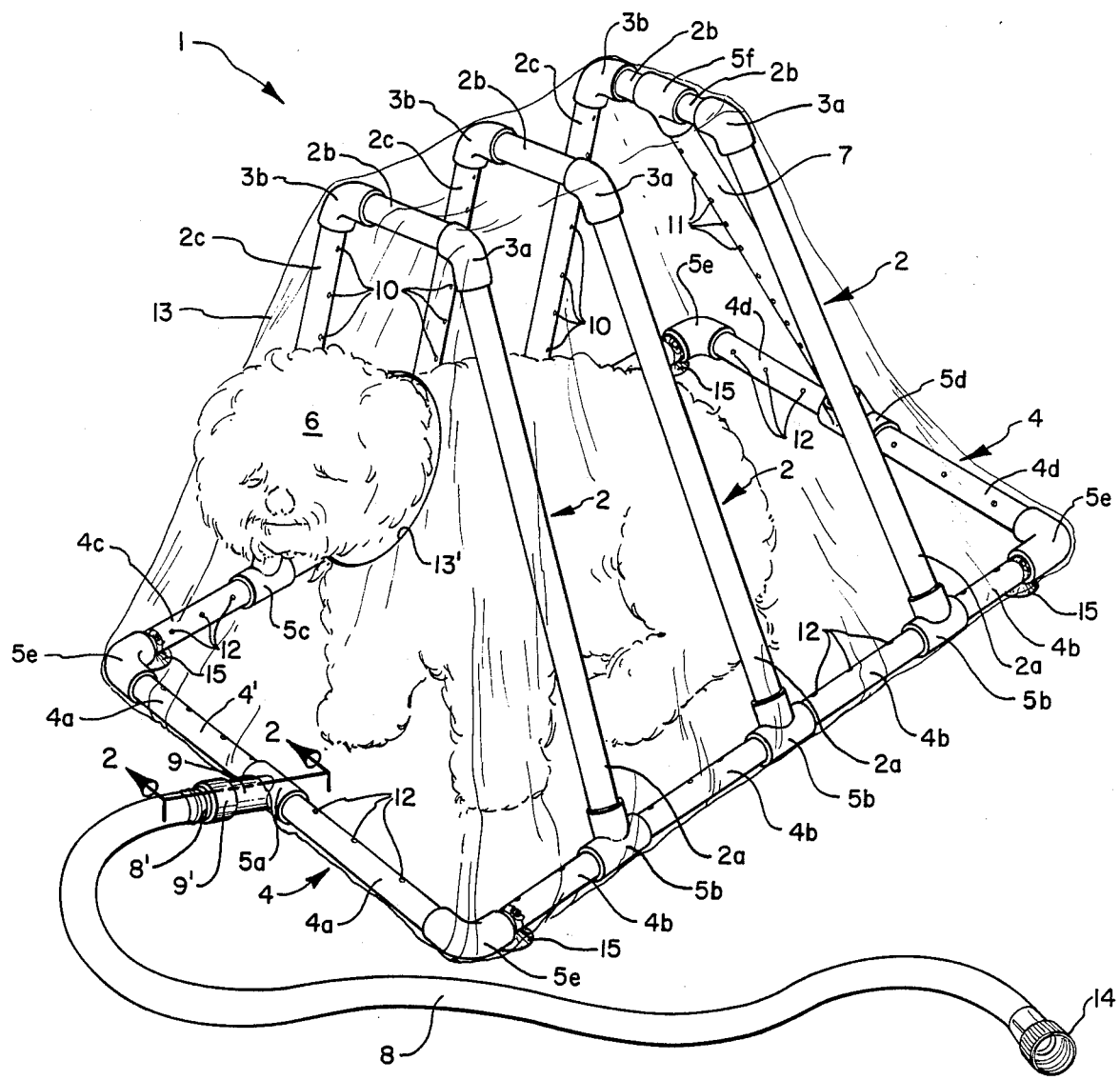
FIG. 1 depicts the preferred embodiment of the animal shower of this invention.
Figure 2:
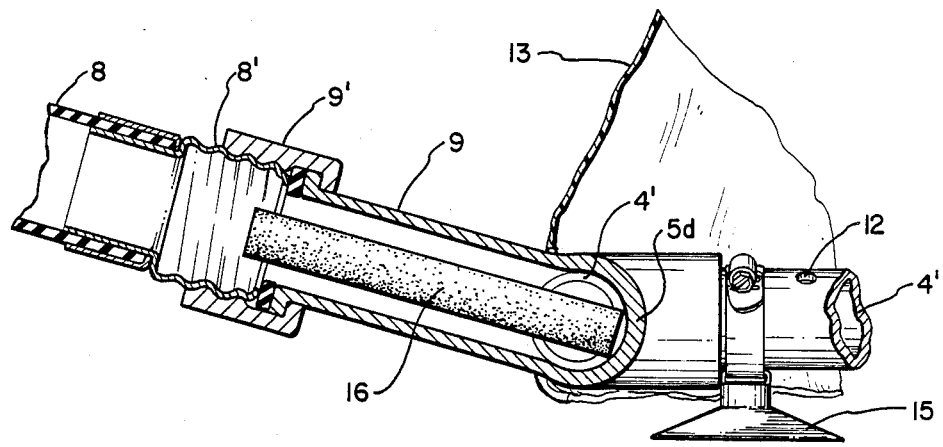
FIG. 2 depicts the preferred embodiment of the soap introduction system of this invention.

FIGS. 1 and 2 depict an embodiment of the invention which represents the best mode of the invention as presently contemplated by the investors. The animal shower is indicated generally by the numeral 1.

Reference is first made to FIG. 1. The shower 1 includes three U-shaped conduits, each of which is indicated generally by the numeral 2. Each U-shaped conduit 2 is comprised of tubing sections 2a, 2b and 2c which are coupled by couplings 3a and 3b. The ends of tubing sections 2a, 2b and 2c are glued to the inside of couplings 3a and 3b. U-shaped conduits 2 are coupled to a substantially rectangular base conduit shown generally by the numeral 4. The base conduit is comprised of two tubing sections 4a, four tubing sections 4b, four tubing sections 4c and two tubing sections 4d. Tubing sections 4a are coupled together (i.e. connected) by a coupling 5a to form a first base conduit section. Tubing sections 4b are coupled together by couplings 5b to form a second base conduit section. Tubing sections 4c are coupled together by couplings 5c to form a third base conduit section. Tubing sections 4d are coupled together by a coupling 5d to form a fourth base conduit section. The ends of tubing sections 4a, 4b, 4c and 4d are glued to the insides of couplings 5a, 5b, 5c and 5d. The second base conduit section is coupled (i.e. connected) to one end of the first base conduit section by an elbow coupling 5e and is substantially perpendicular to the first base conduit section. The third base conduit section is coupled to the other end of the first base conduit section by a second elbow coupling 5e and is substantially perpendicular to the first base conduit section and substantially parallel with the second base conduit section. One end of the fourth base conduit section is coupled to the available end of the second base conduit section by a coupling 5e and the other end of the fourth base conduit section is coupled to the available end of the third base conduit section by another coupling 5e. Conduit section ends are glued to the insides of couplings 5e to secure the connections. In this manner a substantially rectangular base conduit 4 is formed.

One end of each U-shaped conduit 2 is coupled (i.e. connected) to the second base conduit section by T-couplings 5b. The other end of each U-shaped conduit 2 is coupled to the third base conduit section by T-couplings 5c. U-shaped conduit ends are glued to the insides of T-couplings 5b and 5c. The U-shaped conduits 2 are parallel and are evenly spaced from each other. The U-shaped conduits 2 define an open area which is occupied by animal 6 (in this case a dog). The "open area" is that area within the mouths of the U-shaped conduits 2.

An auxiliary conduit 7 (which is a tubing section) is coupled to the base conduit 4 through coupling 5d and to tubing sections 2b of the rear U-shaped conduit 2 through coupling 5f. The ends of conduit 7 are glued to the insides of couplings 5d and 5f.

T-coupling 5a includes a conduit 9. A hose 8 is connected to conduit 9. Attached to hose 8 is a plastic or metal portion 8' (see FIGS. 1 and 2) having threads. Conduit 9 includes a portion 9' (see FIGS. 1 and 2) which is threaded in a manner compatible with the threads of portion 8'. In a conventional manner 8' and 9' are screwed together to connect hose 8 and conduit 9. Hose 8 is connected to a water source (e.g. conventional shower outlet with shower head removed, conventional water tap, etc.). Water from the water source is supplied to U-shaped conduits 2 and auxiliary conduit 7 through hose 8, conduit 9 and base conduit 4. In this manner, U-shaped conduits 2 receive water from a water source.

U-shaped conduits 2 and auxiliary conduit 7 are perforated. The perforations are holes, some of which are indicated by the numerals 10 (in the U-shaped conduits) and 11 (in the auxiliary conduit 7). It should be noted that tubing sections 2a and 2b are perforated even though the perforations (holes) cannot be seen because of the angle at which these tubing sections are depicted. Water supplied to the U-shaped conduits 2 and auxiliary conduit 7 is directed through the perforations (holes) 10 and 11. The perforations 10 and 11 are positioned to direct the water onto the dog 6. Base conduit 4 is also perforated. The perforations are holes, some of which are indicated by the numeral 12. Water supplied to the base conduit 4 from hose 8 and conduit 9 is directed through the perforations (holes) 12. The perforations 12 are positioned to direct the water onto the dog 6.

Preferably, the perforations are rosebud holes, i.e. each hole is conical (at least partially) in shape in that the diameter of the hole at the inside surface of the conduit is less than the diameter of the hole at the outside surface of the conduit. Holes 10 have a diameter of 1/18" at the inside surface of tubing sections 2a, 2b and 2c and a diameter of 1/16" at the outside surface of tubing sections 2a, 2b and 2c. Holes 11 and 12 are similarly sized and shaped. This rosebud shaping of the holes improves the spray of water.

A clear vinyl plastic cover 13 is positioned over the U-shaped conduits 2. The shape of the cover 13 conforms substantially to the shape of the open area defined by U-shaped conduits 2. The cover 13 confines the water spray. An opening 13' in cover 13 is adapted to allow for positioning of the dog's head through and outside of cover 13 to protect the head against direct water contact.

In operation the shower 1 can be placed over dog 6 (or other animal) and onto a conventional shower floor (or other indoor or outdoor surface). Conventional threaded attachment means 14 connects hose 8 to a shower-head outlet (or other water source). Water flow and temperature are regulated by conventional regulation of shower-head outlet (or other water source). Suction cups 15 are secured to the base conduit 4 to elevate the base conduit above the shower floor (or other surface) and to secure the shower 1 against slippage or movement.

Soapy water can be sprayed onto the dog 6 by inserting into conduit 9 a soap tablet 16. The soap tablet 16 and a soap introduction system are depicted in FIG. 2. A primary conduit is formed by tubing sections 4a and a tubular coupling means. The tubular coupling means is the portion of coupling 5a which couples tubing sections 4a together. The primary conduit is the first base conduit section. Conduit 9 serves as the secondary conduit. Note that secondary conduit 9 is integral with the tubular coupling means and that together they form T-shaped coupling 5a. The secondary conduit 9 is connected at an angle to the primary conduit. In this case, the angle is such that the secondary conduit is perpendicular to the primary conduit. Water flowing through conduit 9 to base conduit 4, U-shaped conduits 2 and auxiliary conduit 7 will contact soap tablet 16 and by virtue of such contact become soapy. The water flow holds soap tablet 16 in place against the inner wall of the primary conduit (i.e. of the tubular coupling means portion of 5a). The length of the soap tablet 16 must be sufficiently greater than the inside diameter of the primary conduit (i.e. of the tubular coupling means portion of coupling 5a) such that the initial flow of water does not cause the tablet to be lost to the primary conduit. The length of the tablet 16 must be greater than the inside diameter of the primary conduit and preferably is greater than twice the inside diameter of the primary conduit. With time, the soap tablet 16 will be dissolved and eventually lost to the primary conduit and base conduit 4.

List of Components

1. Animal shower
2a. one-half inch O.D. CPVC pipe
2b. one-half inch O.D. CPVC pipe
2c. one-half inch O.D. CPVC pipe
3a. 45° angle fitting
3b. 45° angle fitting
4a. one-half inch O.D. CPVC pipe
4b. one-half inch O.D. CPVC pipe
4c. one-half inch O.D. CPVC pipe
4d. one-half inch O.D. CPVC pipe
5a. T-fitting
5b. T-fitting
5c. T-fitting
5d. T-fitting
5e. 90° angle fitting
5f. T-fitting
6. dog
7. one-half inch O.D. CPVC pipe
8. hose
8'. threaded male coupling
9. secondary conduit
9'. threaded female coupling
10. rosebud hole
11. rosebud hole
12. rosebud hole
13. 0.008 inch thick clear vinyl plastic cover
13'. opening in cover
14. threaded attachment means
15. suction cups
15. cylindrical soap tablet (¼" diameter, 2" length)

The foregoing description of a specific embodiment of this invention so fully reveals the general nature of the invention that others can, by applying current knowledge, readily modify such specific embodiment and/or adapt it for various applications without departing from the generic concept, and, therefore, such adaptations and modifications should and are intended to be comprehended within the meaning and range of equivalents of the following claims, which claims define subject matter regarded to be our invention.

We claim:

1. A shower for showering an animal comprising: (a) a plurality of U-shaped conduits which collectively define an open area to be occupied by said animal and (b) a base conduit; wherein said base conduit is comprised of a first base conduit section, a second base conduit section and a third base conduit section; wherein said second base conduit section is coupled to one end of said first base conduit section and is substantially perpendicular to said first base conduit section; wherein said third base conduit section is coupled to the other end of said first base conduit section and is substantially perpendicular to said first base conduit section; wherein said third base conduit section is substantially parallel with said second base conduit section; wherein one end of each U-shaped conduit section is coupled to said second base conduit section and the other end of each U-shaped conduit is coupled to said third base conduit section; wherein said base conduit is adopted to receive water from a water source; wherein said U-shaped conduits are adapted to receive water from said water source through said base conduit; wherein said U-shaped conduits are perforated and the perforations are positioned to direct said water onto said animal; and wherein said shower further comprises a soap introduction system wherein said system comprises (i) a primary conduit, (ii) a secondary conduit connected at an angle to said primary conduit to allow for a flow of water from said secondary conduit to said primary conduit, and (iii) a soap tablet adapted to be positioned inside of said secondary conduit; wherein the length of said soap tablet is sufficiently greater than the inside diameter of said primary conduit such that the initial flow of water does not cause said tablet (when positioned inside of said secondary conduit) to be lost to said primary conduit; wherein said primary conduit is said first base section; and wherein said secondary conduit provides a means through which water from said water source can be introduced into said base conduit.

2. A shower for showering an animal comprising: a plurality of U-shaped conduits which collectively define an open area to be occupied by said animal and a base conduit to which said U-shaped conduits are connected; wherein said U-shaped conduits are adapted to receive water from a water source; wherein said U-shaped conduits are perforated and the perforations are positioned to direct said water onto said animal; wherein said base conduit provides a means through which water from said water source can be supplied to said U-shaped conduits; and wherein said shower further comprises a soap introduction system wherein said system comprises (i) a primary conduit, (ii) a secondary conduit connected at an angle to said primary conduit to allow for a flow of water from said secondary conduit to said primary conduit, and (iii) a soap tablet adapted to be positioned inside of said secondary conduit; wherein the length of said soap tablet is sufficiently greater than the inside diameter of said primary conduit such that the initial flow of water does not cause said tablet (when positioned inside of said secondary conduit) to be lost to said primary conduit; wherein said primary conduit is part of said base conduit; and wherein said secondary conduit provides a means through which water from said water source can be introduced into said base conduit.

3. A soap introduction system comprising:
 (a) a primary conduit;
 (b) a secondary conduit connected at an angle to said primary first conduit to allow for a flow of water from said secondary conduit to said primary conduit; and
 (c) a soap tablet adapted to be positioned inside of said secondary conduit;

wherein the length of said soap tablet is sufficiently greater than the inside diameter of said primary conduit such that the initial flow of water does not cause said tablet (when positioned inside of said secondary conduit) to be lost to said primary conduit.

4. A soap introduction system in accordance with claim 3 wherein the length of said soap tablet is greater than twice the inside diameter of said primary conduit and wherein said secondary conduit is substantially perpendicular to said primary conduit.

5. A soap introduction system in accordance with claim 4 wherein said primary conduit is comprised of two tubing sections and a first tubular coupling means; wherein said first tubular coupling means couples said two tubing sections to each other to form said primary conduit; and wherein said secondary conduit is integral with said first tubular coupling and forms with said first tubular coupling a T-shaped coupling.

6. A soap introduction system in accordance with claim 3 wherein the flow of water from said secondary conduit to said primary conduit holds said soap tablet against the inner wall of said primary conduit.

7. A soap introduction system in accordance with claim 3 wherein the opposite end of said secondary conduit includes a means for coupling said secondary conduit to a hose; and wherein said opposite end is the end of said secondary conduit opposite to the end coupled to said primary conduit.

* * * * *